(12) United States Patent
Ikeda et al.

(10) Patent No.: US 11,728,518 B2
(45) Date of Patent: Aug. 15, 2023

(54) RECTANGULAR SECONDARY BATTERY

(71) Applicant: Hitachi Automotive Systems, Ltd., Hitachinaka (JP)

(72) Inventors: Kohtaroh Ikeda, Hitachinaka (JP); Kouichi Kajiwara, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 90 days.

(21) Appl. No.: 15/565,201

(22) PCT Filed: Mar. 28, 2016

(86) PCT No.: PCT/JP2016/059792
§ 371 (c)(1),
(2) Date: Oct. 9, 2017

(87) PCT Pub. No.: WO2016/170920
PCT Pub. Date: Oct. 27, 2016

(65) Prior Publication Data
US 2018/0062123 A1 Mar. 1, 2018

(30) Foreign Application Priority Data
Apr. 21, 2015 (JP) .................................. 2015-086898

(51) Int. Cl.
*H01M 10/00* (2006.01)
*H01M 10/0587* (2010.01)
(Continued)

(52) U.S. Cl.
CPC ..... *H01M 10/0587* (2013.01); *H01M 50/103* (2021.01); *H01M 50/147* (2021.01);
(Continued)

(58) Field of Classification Search
CPC ........ H01M 2/06; H01M 2/0237; H01M 2/04; H01M 2/08; H01M 2/22; H01M 2/30;
(Continued)

(56) References Cited

U.S. PATENT DOCUMENTS

2016/0254517 A1* 9/2016 Tsunaki ................ H01M 2/305
429/179
2016/0293931 A1* 10/2016 Sawada ............... H01M 2/0404
(Continued)

FOREIGN PATENT DOCUMENTS

JP 2005-56648 A 3/2005
JP 2006-216411 A 8/2006
(Continued)

OTHER PUBLICATIONS

DERWENT English abstract for JP 2008-251213 (Minamisaka et al) (Year: 2008).*
(Continued)

*Primary Examiner* — Cynthia H Kelly
*Assistant Examiner* — Monique M Wills
(74) *Attorney, Agent, or Firm* — Crowell & Moring LLP

(57) ABSTRACT

Provided is a rectangular secondary cell enabling seal performance of a gasket to be improved with a simple structure without enlarging a shaft of a terminal. A rectangular secondary cell according to the present invention includes a cell can housing a winding group and having an opening portion, a lid provided with a positive electrode terminal electrically connected to the winding group and closing the opening portion, and a gasket having an interposed portion interposed between the lid and a lower surface of the positive electrode terminal. In the gasket, an external shape of the interposed portion is smaller than an external shape of the lower surface of the positive electrode terminal.

6 Claims, 10 Drawing Sheets

(51) Int. Cl.
  *H01M 50/147* (2021.01)
  *H01M 50/528* (2021.01)
  *H01M 50/103* (2021.01)
  *H01M 50/553* (2021.01)
  *H01M 50/55* (2021.01)
  *H01M 50/176* (2021.01)
  *H01M 10/052* (2010.01)

(52) U.S. Cl.
  CPC ....... *H01M 50/176* (2021.01); *H01M 50/528* (2021.01); *H01M 50/55* (2021.01); *H01M 50/553* (2021.01); *H01M 10/052* (2013.01); *H01M 2220/20* (2013.01); *Y02E 60/10* (2013.01)

(58) Field of Classification Search
  CPC .. H01M 2/305; H01M 50/172; H01M 50/528; H01M 50/543; H01M 50/10; H01M 50/147; H01M 10/0587; H01M 10/052; H01M 2220/20
  See application file for complete search history.

(56) References Cited

U.S. PATENT DOCUMENTS

2016/0301061 A1* 10/2016 Urano ................. H01M 2/0217
2017/0373302 A1* 12/2017 Hirose ................. H01G 11/16

FOREIGN PATENT DOCUMENTS

| JP | 2008-251213 A | 10/2008 | | |
|---|---|---|---|---|
| JP | 2008-305646 A | 12/2008 | | |
| JP | 2009-87753 A | 4/2009 | | |
| JP | 2010-282848 A | 12/2010 | | |
| JP | 5021900 B2 | 9/2012 | | |
| JP | 2016-91720 A | 5/2016 | | |
| WO | WO-2015097770 A1 * | 7/2015 | .......... | H01M 2/0217 |
| WO | WO-2015097785 A1 * | 7/2015 | .......... | H01M 2/0404 |

OTHER PUBLICATIONS

DERWENT English abstract for JP 2006-216411 (Takimoto et al) (Year: 2006).*
JPO English abstract for JP 2010-282848. (Year: 2010).*
Machine-assisted English translation for JP 2010-282848. (Year: 2010).*
JP-2006216411-A Takimoto machine translation (Year: 2006).*
JP-2008251213-A Minamisaka machine translation (Year: 2008).*
European Search Report issued in counterpart European Application No. 16782942.3 dated Aug. 14, 2018 (seven (7) pages).
International Search Report (PCT/ISA/210) issued in PCT Application No. PCT/JP2016/059792 dated Jul. 12, 2016 with English translation (4 pages).
Japanese-language Written Opinion (PCT/ISA/237) issued in PCT Application No. PCT/JP2016/059792 dated Jul. 12, 2016 (5 pages).

* cited by examiner

CROSS-SECTION ALONG LINE B-B

CROSS-SECTION ALONG LINE B—B

CROSS-SECTION ALONG LINE B—B

CROSS-SECTION ALONG LINE B-B

RECTANGULAR SECONDARY BATTERY

TECHNICAL FIELD

The present invention relates to a secondary cell for in-vehicle application or the like.

BACKGROUND ART

In recent years, high-capacity (Wh) secondary cells are being developed as power sources for electric hybrid vehicles, battery electric vehicles, or the like, and among the secondary cells, a rectangular lithium ion secondary cell having high energy density (Wh/kg) attracts attention.

In the rectangular lithium ion secondary cell, gas or an electrolyte generated from the inside of the cell is required to be confined. PTL 1 discloses a technique in which seal performance of a rectangular bottomed-cylindrical insulating seal member into which a rectangular terminal is to be inserted is improved, and in which the seal performance in a high-temperature cycle is enhanced.

According to the technique described in PTL 1, the terminal is secured to a lid by inserting a shaft of the terminal into a through hole of the lid and swaging a tip end of the shaft, and the insulating seal member interposed between the terminal and the lid is broader in size than a lower surface of the terminal opposed to the lid and is protruded laterally. The insulating seal member contacts the entire lower surface of the terminal and is pressed by the lid. The external shape of a part of the insulating seal member functioning as a seal portion is equal to the external shape of the lower surface of the terminal.

CITATION LIST

Patent Literature

PTL 1: JP 2009-87753 A

SUMMARY OF INVENTION

Technical Problem

To secure desired seal performance of the gasket, the interposed gasket needs to be compressed with a compression force having a predetermined value or higher. The compression force can be improved by increasing a force to swage the shaft of the terminal and providing a gasket compression surface of the terminal with a protrusion to form a seal point.

In this manner, to increase the swaging force, the shaft of the terminal needs to be enlarged. However, the enlargement is difficult in consideration of a recent tendency toward decreasing the thickness of the cell can. Also, providing the gasket compression surface of the terminal with the protrusion may cause the shape of the terminal to be complicated and lead to an increase of manufacturing cost.

The present invention is accomplished by taking such problems as mentioned above into consideration thereof, and an object thereof is to provide a rectangular secondary cell enabling seal performance of a gasket to be improved with a simple structure without enlarging a shaft of a terminal.

Solution to Problem

In order to solve the above issue, a rectangular secondary cell according to an aspect of the present invention includes: a cell can housing a winding group and having an opening portion; a lid provided with an external terminal electrically connected to the winding group and closing the opening portion; and a gasket having an interposed portion interposed between the lid and a lower surface of the external terminal, wherein, in the gasket, an external shape of the interposed portion is smaller than an external shape of the lower surface of the external terminal.

Advantageous Effects of Invention

Due to the above solution, in the present invention, a compression force per unit area to be applied to a gasket can be higher than in a case in which the external shape of an interposed portion is equal in size to the external shape of a lower surface of an external terminal. Accordingly, seal performance of the gasket can be improved with a simple structure without enlarging a shaft of the terminal. Meanwhile, problems, configurations, and effects other than those described above will be apparent from the following description of embodiments.

DESCRIPTION OF EMBODIMENTS

Hereinbelow, embodiments of a rectangular secondary cell according to the present invention will be described with reference to the drawings.

First Embodiment

Figure 1:
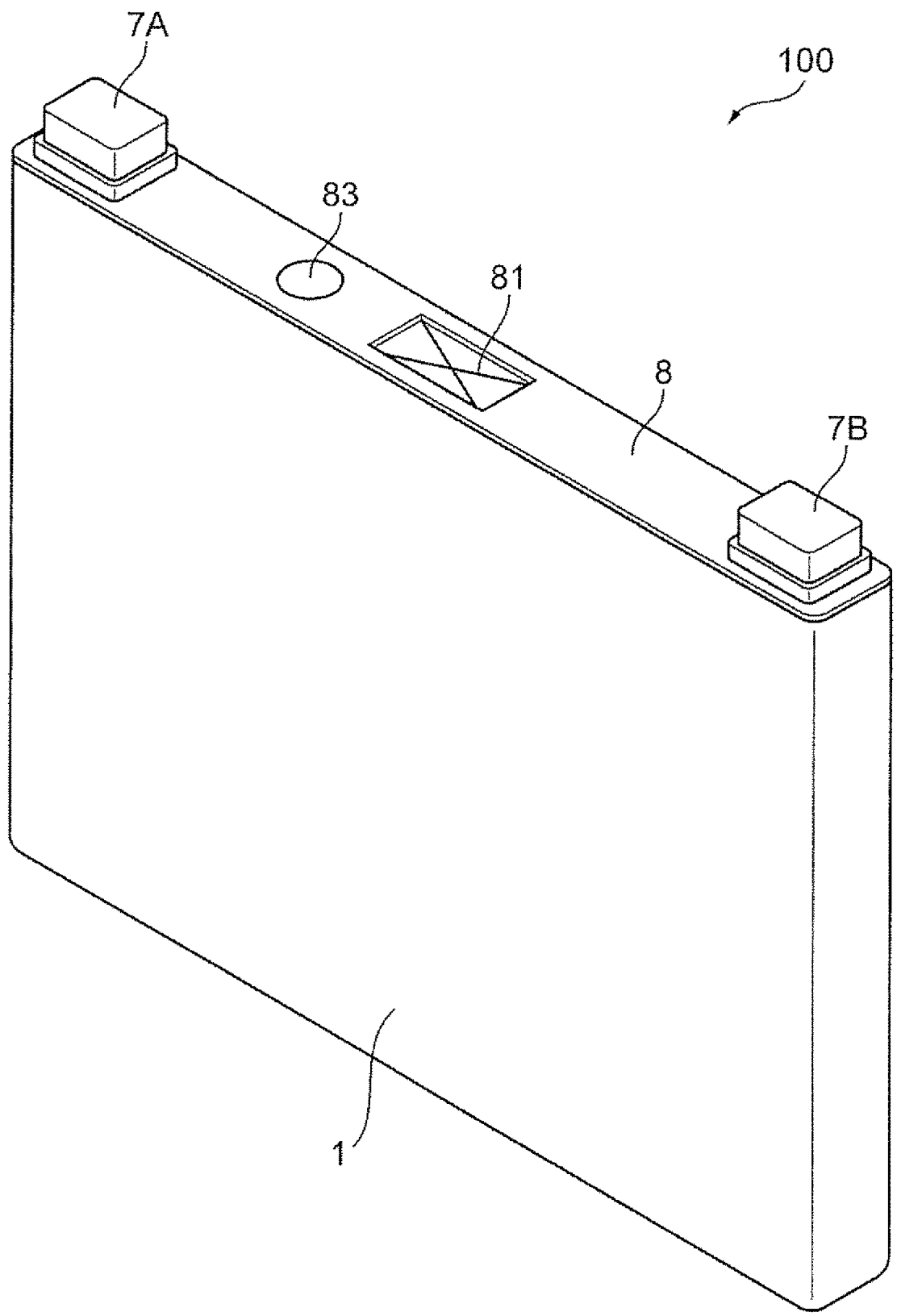
FIG. 1 is an external perspective view of a rectangular secondary cell.
Figure 2:
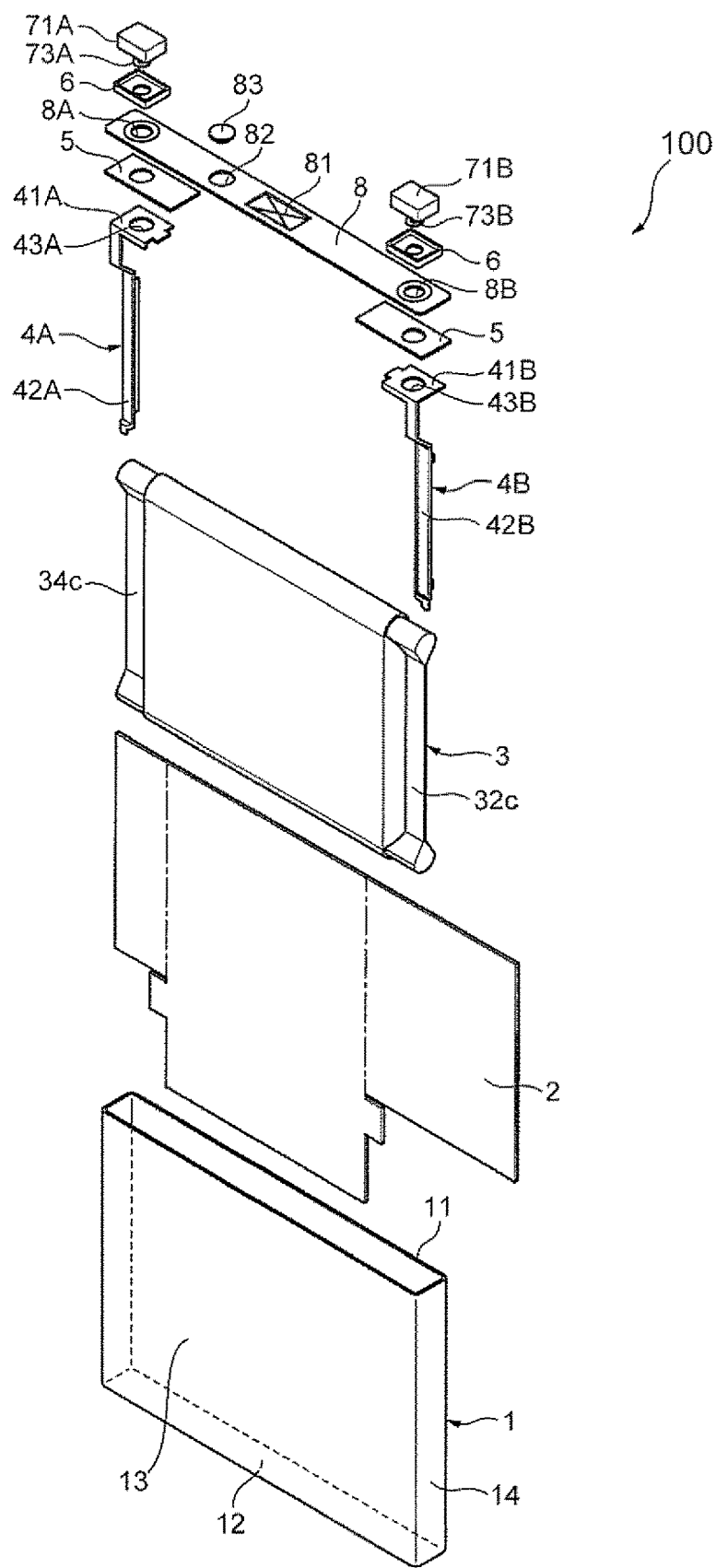
FIG. 2 is an exploded perspective view of the rectangular secondary cell.

FIG. 1 is an external perspective view of a rectangular secondary cell, and FIG. 2 is an exploded perspective view of the rectangular secondary cell.

A rectangular secondary cell 100 includes a cell can 1 and a lid 8. The cell can 1 includes a rectangular bottom surface 12 having a pair of longer sides and a pair of shorter sides, a pair of opposed wider side surfaces 13 continuing with the pair of longer sides of the bottom surface 12 and having relatively large areas, and a pair of opposed narrower side surfaces 14 continuing with the pair of shorter sides of the bottom surface 12 and having relatively small areas. At an upper portion opposed to the bottom surface 12, an opening portion 11 is formed.

A flat winding group 3 is housed in the cell can 1, and the opening portion 11 of the cell can 1 is tightly sealed by the lid 8. The lid 8 is large enough to close the opening portion 11 and is formed in a flat plate shape which is approximately rectangular in a planar view, and a circumferential edge of the lid 8 is welded to an opening edge of the opening portion 11. The lid 8 is provided with a positive electrode terminal 7A and a negative electrode terminal 7B which are external terminals. Via the positive electrode terminal 7A and the negative electrode terminal 7B, the winding group 3 is electrically charged, and electric power is supplied to an external load. The lid 8 is integrally provided with a gas exhaust valve 81. When the pressure in the cell container increases, the gas exhaust valve 81 fissures to cause gas in the cell can 1 to be exhausted, and the pressure in the cell can 1 is decreased. Consequently, the safety of the rectangular secondary cell 100 is secured.

In the cell can 1, the winding group 3 is housed via an insulating protective film 2. Since the winding group 3 is formed in a flat shape, the winding group 3 includes a pair of opposed curved surface portions each having a semicircular cross-section and a flat surface portion formed to continue between the curved surface portions as a pair. As for the winding group 3, one curved surface portion side thereof is inserted in the cell can 1 while the other curved surface portion side is arranged on the side of the opening portion 11 so that a winding axial direction may go along the lateral width direction of the cell can 1.

A positive electrode metal foil exposure portion 34c of the winding group 3 is electrically connected to the positive electrode terminal 7A via a positive electrode collector plate 4A. Also, a negative electrode metal foil exposure portion 32c of the winding group 3 is electrically connected to the negative electrode terminal 7B via a negative electrode collector plate 4B. Accordingly, electric power is supplied from the winding group 3 to the external load via the positive electrode collector plate 4A and the negative electrode collector plate 4B, and externally generated electric power is supplied to the winding group 3 via the positive electrode collector plate 4A and the negative electrode collector plate 4B to cause the winding group 3 to be charged.

To electrically insulate the positive electrode collector plate 4A and the negative electrode collector plate 4B, and the positive electrode terminal 7A and the negative electrode terminal 7B, from the lid 8, respectively, gaskets 6 and insulating plates 5 are provided to the lid 8. An example of a material forming the positive electrode terminal 7A and the positive electrode collector plate 4A is an aluminum alloy, and an example of a material forming the negative electrode terminal 7B and the negative electrode collector plate 4B is a copper alloy. Also, examples of a material forming the insulating plates 5 and the gaskets 6 are insulating resin materials such as polybutylene terephthalate, polyphenylene sulfide, and perfluoro alkoxy fluororesin.

Also, the lid 8 is provided with a liquid filling hole 82 through which the cell can 1 is filled with an electrolyte. The liquid filling hole 82 is sealed by a liquid filling stop 83 after the electrolyte is filled in the cell can 1. An applicable electrolyte to be filled in the cell can 1 is a non-aqueous electrolyte in which a lithium salt such as lithium hexafluorophosphate ($LiPF_6$) is dissolved in a carbonate ester organic solvent such as ethylene carbonate, for example.

The positive electrode terminal 7A and the negative electrode terminal 7B include rectangular terminal heads 71A and 71B exposed to the outside and connected to bus bars or the like by welding. Lower surfaces 72A and 72B of the terminal heads 71A and 71B are provided with shaft portions 73A and 73B protruded therefrom, respectively. The shaft portions 73A and 73B pass through the lid 8 and are protruded further on the inner side of the cell can 1 than a positive electrode collector plate base portion 41A and a negative electrode collector plate base portion 41B of the positive electrode collector plate 4A and the negative electrode collector plate 4B, are swaged at tip ends thereof, and secure the positive electrode terminal 7A, the negative electrode terminal 7B, the positive electrode collector plate 4A, and the negative electrode collector plate 4B integrally with the lid 8. Between the positive electrode terminal 7A and the lid 8 and between the negative electrode terminal 7B and the lid 8, the gaskets 6 are interposed, respectively. Between the positive electrode collector plate 4A and the lid 8 and between the negative electrode collector plate 4B and the lid 8, the insulating plates 5 are interposed, respectively.

The positive electrode collector plate 4A and the negative electrode collector plate 4B include the positive electrode collector plate base portion 41A and the negative electrode collector plate base portion 41B arranged to be opposed to and parallel to the lower surface of the lid 8 and formed in rectangular plate shapes and a positive electrode side connection end portion 42A and a negative electrode side connection end portion 42B bent at side ends of the positive electrode collector plate base portion 41A and the negative electrode collector plate base portion 41B, extending toward the side of the bottom surface 12 along the wider side surfaces 13 of the cell can 1, and connected to the positive electrode metal foil exposure portion 34c and the negative electrode metal foil exposure portion 32c of the winding group 3. The positive electrode collector plate base portion 41A and the negative electrode collector plate base portion 41B are provided with a positive electrode side opening hole 43A and a negative electrode side opening hole 43B through which the shaft portions 73A and 73B pass, respectively.

The insulating protective film 2 is wound around the winding group 3 with a direction along a flat surface of the winding group 3 and perpendicular to the winding axial direction of the winding group 3 as a center axial direction. The insulating protective film 2 includes one sheet or a plurality of film members made of a synthetic resin such as PP (polypropylene) and is long enough to be wound with a direction parallel to the flat surface of the winding group 3 and perpendicular to the winding axial direction as a winding center.

Figure 3:
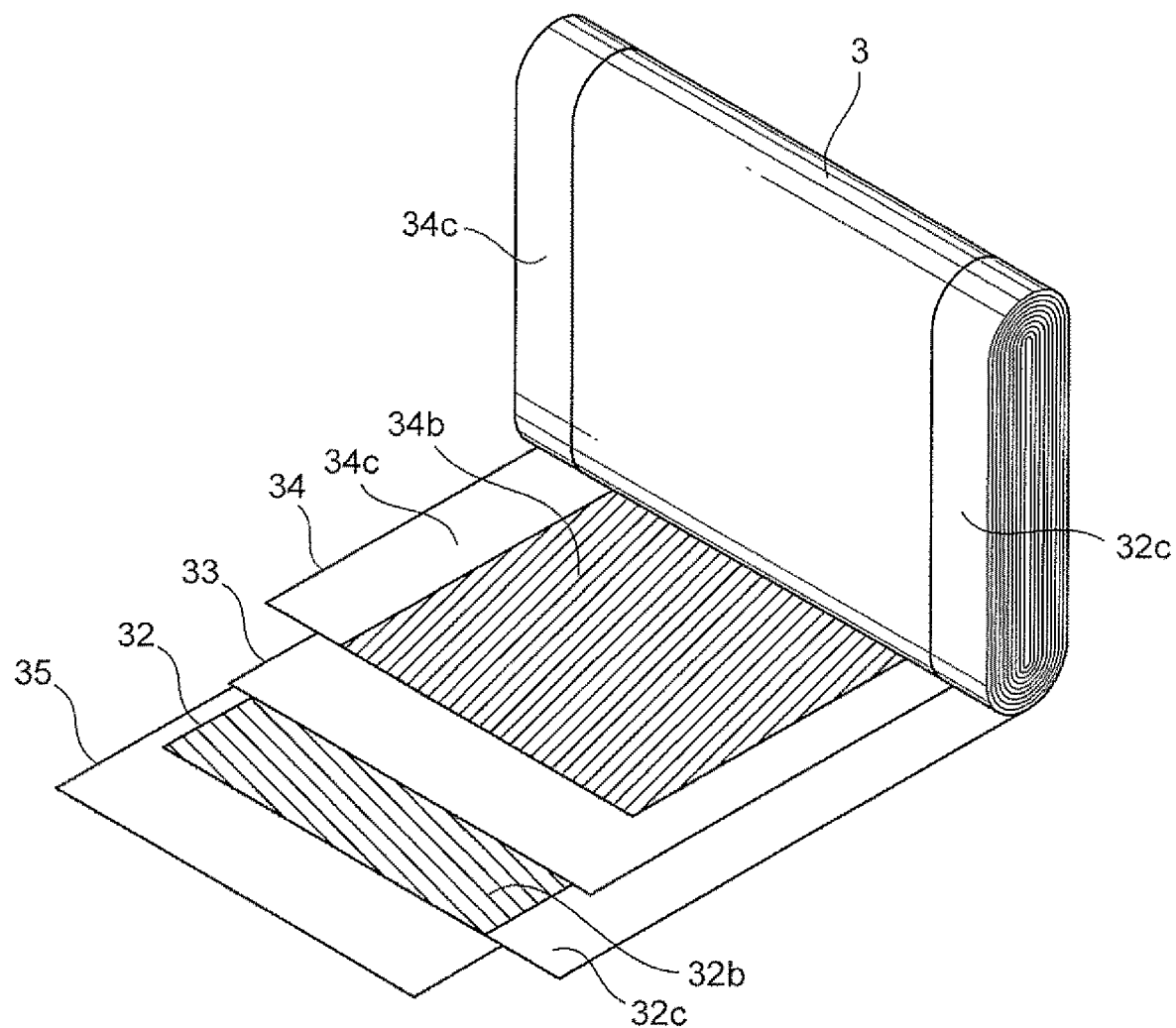
FIG. 3 is an exploded perspective view of a winding electrode group.

FIG. 3 is an exploded perspective view illustrating a state in which apart of the winding group according to the first embodiment is developed.

The winding group 3 is formed by winding a negative electrode 32 and a positive electrode 34 in flat shapes with separators 33 and 35 interposed therebetween. In the winding group 3, the outermost electrode is the negative electrode 32, and the separators 33 and 35 are wound further outside the negative electrode 32. The separators 33 and 35 function to insulate the positive electrode 34 from the negative electrode 32.

A part of the negative electrode 32 on which a negative electrode mixture layer 32b is applied is larger in the width direction than a part of the positive electrode 34 on which a positive electrode mixture layer 34b is applied. Accordingly, the part on which the positive electrode mixture layer 34b is applied is adapted to be covered with the part on which the negative electrode mixture layer 32b is applied. The positive electrode metal foil exposure portion 34c and the negative electrode metal foil exposure portion 32c are bound at flat surface parts thereof and are connected by means of welding or the like. Meanwhile, although the separators 33 and 35 are broader in width than the part on which the negative electrode mixture layer 32b is applied, the separators 33 and 35 are not obstacles in the case in which the positive electrode metal foil exposure portion 34c and the negative electrode metal foil exposure portion 32c are bound and connected since the separators 33 and 35 are wound at positions allowing metal foil surfaces of end portions of the positive electrode metal foil exposure portion 34c and the negative electrode metal foil exposure portion 32c to be exposed.

The positive electrode 34 includes the positive electrode mixture layer made by applying a positive electrode active material mixture on both surfaces of a positive electrode metal foil serving as a positive electrode collector. The positive electrode 34 is provided at an end portion of the positive metal foil on one side in the width direction with the positive electrode metal foil exposure portion 34c on which the positive electrode active material mixture is not applied. The negative electrode 32 includes the negative electrode mixture layer made by applying a negative electrode active material mixture on both surfaces of a negative electrode metal foil serving as a negative electrode collector. The negative electrode 32 is provided at an end portion of the negative metal foil on the other side in the width direction with the negative electrode metal foil exposure portion 32c on which the negative electrode active material mixture is not applied. The positive electrode metal foil exposure portion 34c and the negative electrode metal foil exposure portion 32c are regions at which the surfaces of the metal foils are exposed and are wound to be arranged on one side and on the other side in the winding axial direction.

As for the negative electrode 32, to 100 parts by weight of amorphous carbon powder serving as the negative electrode active material, 10 parts by weight of polyvinylidene fluoride (hereinbelow referred to as PVDF) serving as a binder were added, and N-methylpyrrolidone (hereinbelow referred to as NMP) serving as a dispersing solvent was added and kneaded to produce the negative electrode mixture. The negative electrode mixture was applied to both surfaces of a copper foil (negative electrode metal foil) having the thickness of 10 μm without being applied to the welded portion (portion to which the negative electrode is not applied). After drying, pressing, and cutting processes, the negative electrode 32 in which the thickness of the negative electrode active material applied portion excluding the copper foil was 70 μm was then obtained.

Meanwhile, although a case of using the amorphous carbon as the negative electrode active material has been illustrated in the present embodiment, the present invention is not limited to this. The negative electrode active material may be natural graphite enabling adsorption and desorption of lithium ions, any of various artificial graphite materials, a carbonaceous material such as a coke, a compound of Si, Sn, or the like (for example, SiO and $TiSi_2$), or a composite material thereof. The particle form is not particularly limited and may be a scale-like form, a spherical form, a fibrous form, a massive form, or the like.

As for the positive electrode 34, to 100 parts by weight of lithium manganese oxide (chemical formula: $LiMn_2O_4$) serving as the positive electrode active material, 10 parts by weight of scale-like graphite serving as a conductive material and 10 parts by weight of the PVDF serving as a binder were added, and the NMP serving as a dispersing solvent was added and kneaded to produce the positive electrode mixture. The positive electrode mixture was applied to both surfaces of an aluminum foil (positive electrode metal foil) having the thickness of 20 μm without being applied to the welded portion (portion to which the positive electrode is not applied). After drying, pressing, and cutting processes, the positive electrode 34 in which the thickness of the positive electrode active material applied portion excluding the aluminum foil was 90 μm was then obtained.

Meanwhile, although a case of using the lithium manganese oxide as the positive electrode active material has been illustrated in the present embodiment, the positive electrode active material may be different lithium manganese oxide having a spinel crystal structure, lithium-manganese composite oxide into which the different lithium manganese oxide is partially substituted or doped with a metal element, lithium cobaltite or lithium titanate having a layered crystal structure, or lithium-metal composite oxide into which the lithium cobaltite or lithium titanate is partially substituted or doped with a metal element.

Also, although a case of using the PVDF as the binder for each of the applied portions in the positive electrode and the negative electrode has been illustrated in the present embodiment, the binder may be a polymer or mixture of polytetrafluoroethylene (PTFE), polyethylene, polystyrene, polybutadiene, butyl rubber, nitrile rubber, styrene butadiene rubber, polysulfide rubber, cellulose nitrate, cyanoethyl cellulose, any of various latex kinds, acrylonitrile, vinyl fluoride, vinylidene fluoride, propylene fluoride, chloroprene fluoride, an acrylic resin, and the like. Also, as a shaft center, one configured by winding a resin sheet having higher flexural rigidity than those of a positive electrode foil 34a, a negative electrode foil 32a, and the separator 33 can be used, for example.

Next, a seal structure of the external terminal will be described in detail.

Figure 4:
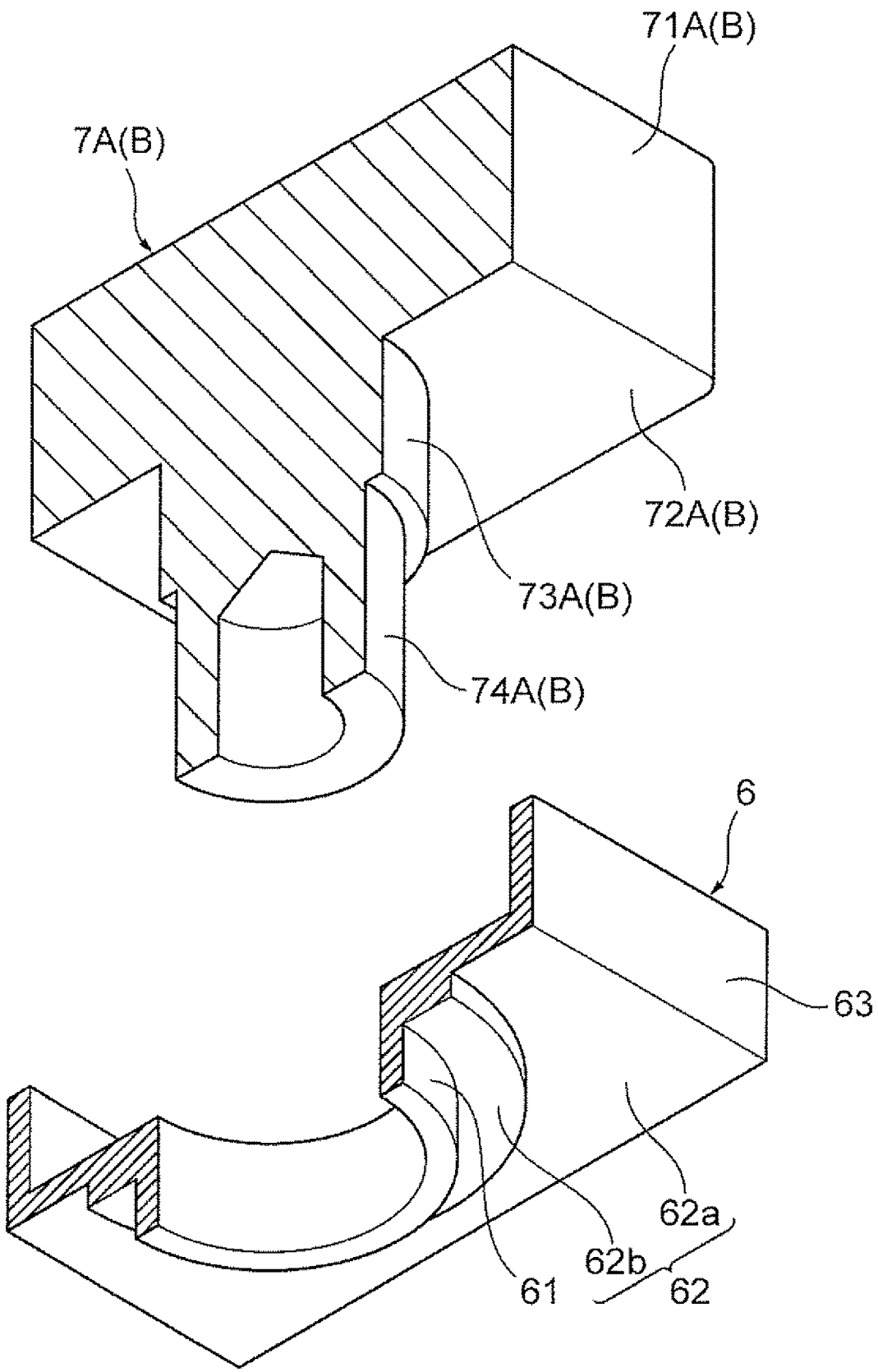
FIG. 4 is an exploded perspective view of a positive electrode external terminal and a gasket.
Figure 5A:
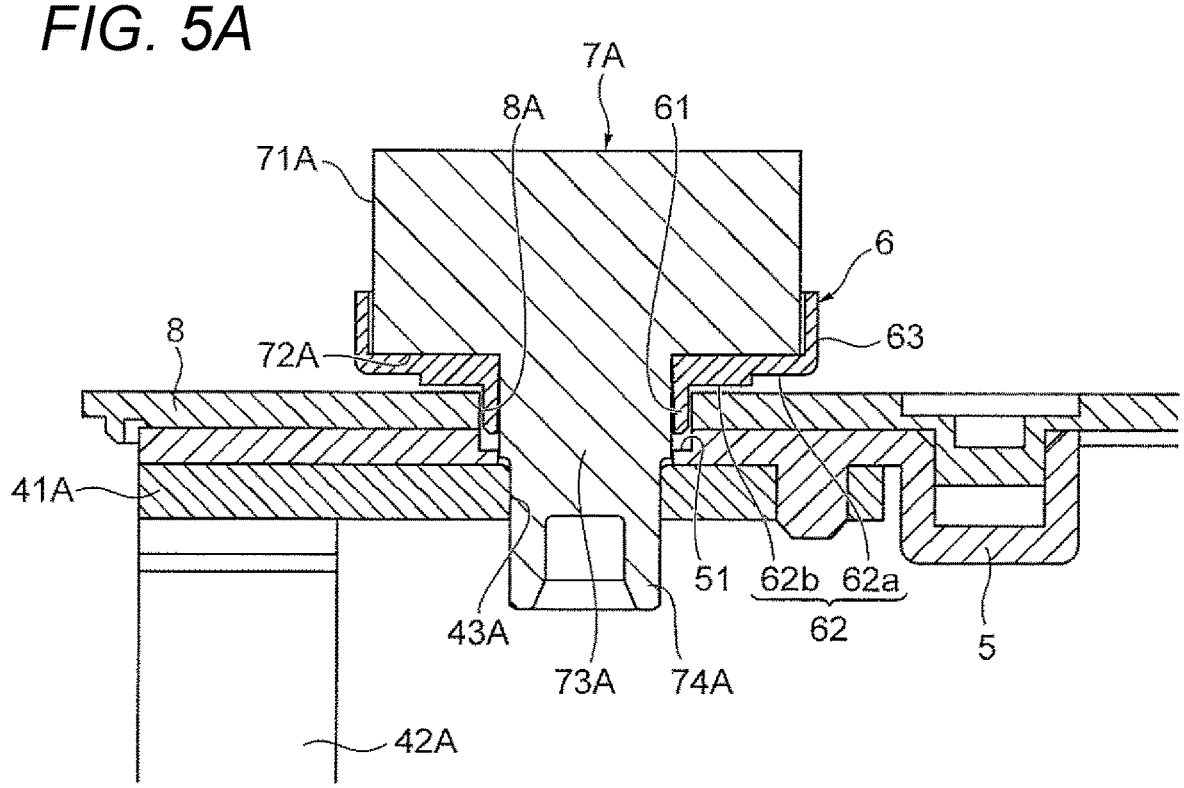
FIGS. 5A and 5B are enlarged cross-sectional views illustrating a main part of a lid assembly.
Figure 5B:
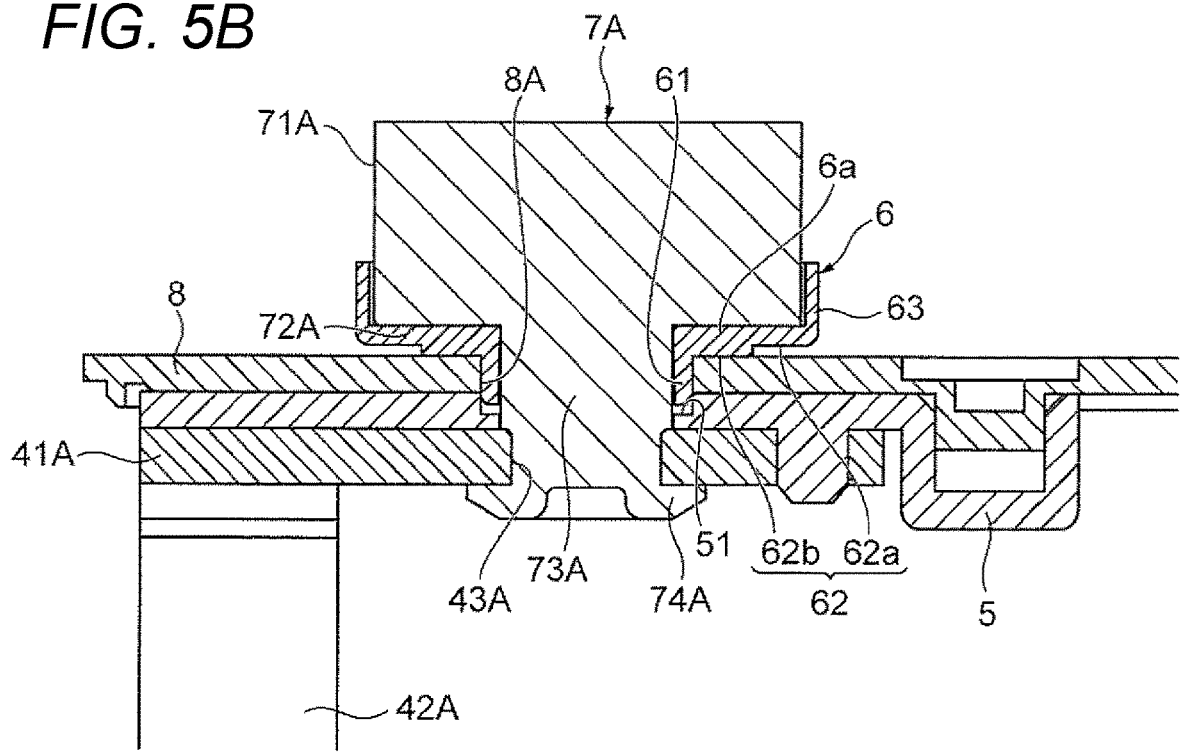
Figure 6A:
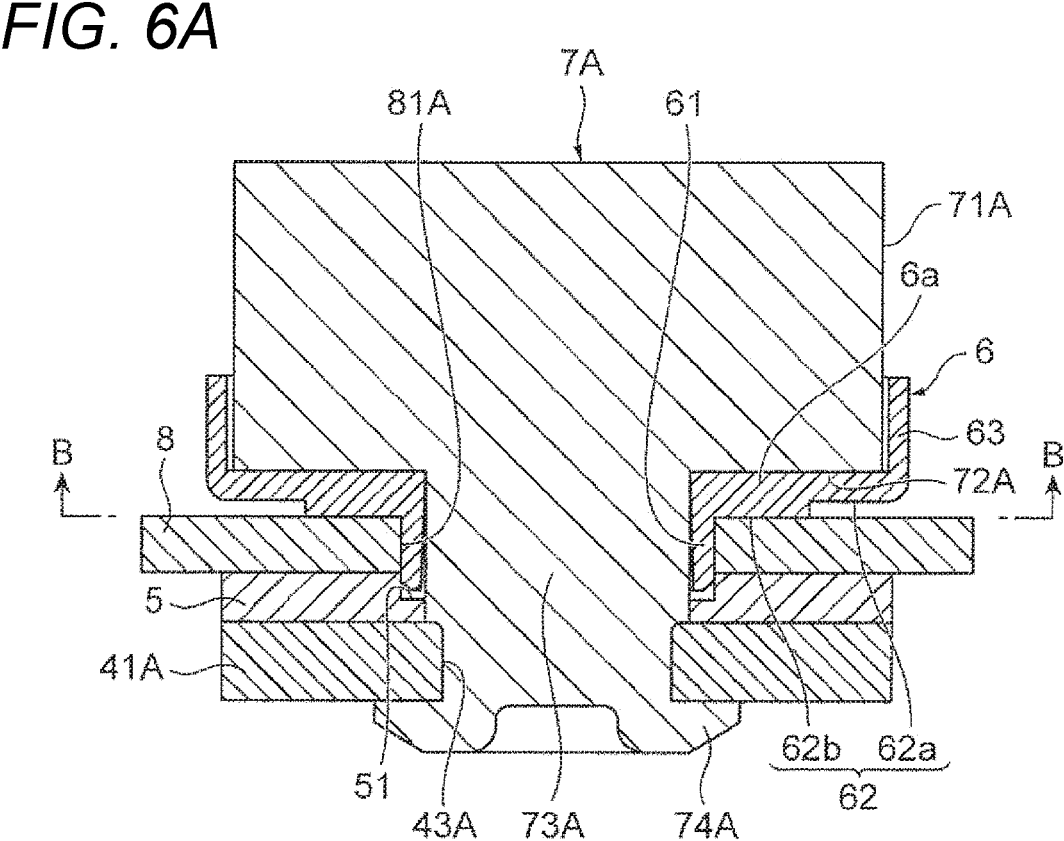
FIGS. 6A and 6B illustrate an example of a seal structure according to a first embodiment.
Figure 6B:
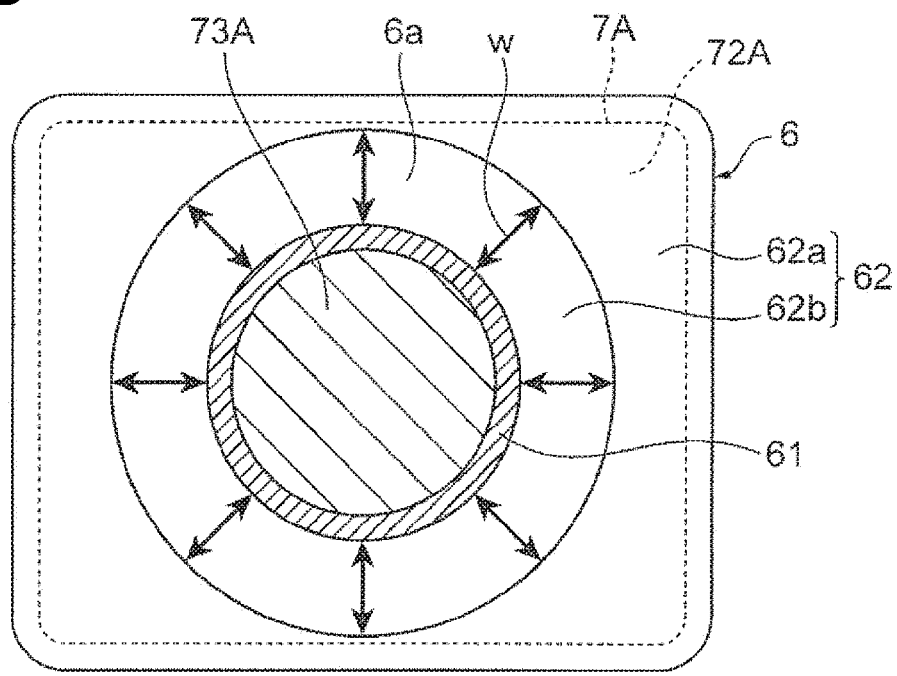

FIG. 4 is a partially cross-sectional exploded perspective view illustrating configurations of the terminal and the gasket according to the first embodiment, FIG. 5 is an enlarged cross-sectional view illustrating a main part of a lid assembly according to the first embodiment, and FIG. 6 illustrates an example of a seal structure of the gasket according to the first embodiment. FIG. 5(a) is a cross-sectional view before swaging while FIG. 5(b) is a cross-sectional view after swaging. FIG. 6(a) is an enlarged view of a main part of a seal structure while FIG. 6(b) is a cross-sectional view along the line B-B in FIG. 6 (a).

Since the positive electrode terminal 7A and the negative electrode terminal 7B, which are external terminals, are basically equivalent to each other except the materials and the symmetric arrangement, the positive electrode terminal 7A will be described below, and description of the negative electrode terminal 7B will be omitted. It is to be noted that the present invention is not only applicable to the positive electrode terminal 7A but also applicable to at least either the positive electrode terminal 7A or the negative electrode terminal 7B.

As illustrated in FIG. 4, the positive electrode terminal 7A includes the terminal head 71A formed in a rectangular solid block shape and the cylindrical shaft portion 73A. The terminal head 71A has the lower surface 72A having a rectangular external shape, and the shaft portion 73A is protruded from a center position of the lower surface 72A. The shaft portion 73A is provided at a tip end portion thereof with a cylindrical swaging portion 74A, and an outer circumference of the swaging portion 74A is further decreased in diameter than an outer circumference of the shaft portion 73A.

When the positive electrode terminal 7A is swaged and secured, the gasket 6 is interposed between the positive electrode terminal 7A and the lid 8 and is elastically deformed to seal the space between the inside and the outside of the cell. As a material for the gasket 6, an insulating resin such as polybutylene terephthalate (PBT) and perfluoro alkoxy alkane (PFA) can be used.

As illustrated in FIG. 4, the gasket 6 includes a cylindrical portion 61 through which the shaft portion 73A of the positive electrode terminal 7A passes and a flange portion 62 spreading outward in the radial direction from the base end of the cylindrical portion 61 and opposed to the lower surface 72A of the terminal head 71A. The cylindrical portion 61 has a predetermined diameter. As illustrated in FIGS. 5 (b) and 6 (a), when the cylindrical portion 61 is inserted into a through hole 8A of the lid 8, the tip end of the cylindrical portion 61 is inserted into a stepped hole 51 of the insulating plate 5. The cylindrical portion 61 receives the shaft portion 73A of the positive electrode terminal 7A to cause the shaft portion 73A to fit thereonto so that the inner circumferential surface of the cylindrical portion 61 may be opposed to the outer circumferential surface of the shaft portion 73A and is inserted into the through hole 8A of the lid 8 so that the outer circumferential surface of the cylindrical portion 61 may be opposed to the inner circumferential surface of the through hole 8A of the lid 8.

As illustrated in FIG. 6(b), the external shape of the flange portion 62 having an approximately equal size to that of the lower surface 72A of the terminal head 71A is rectangular. As illustrated in FIG. 6(a), the edge of the flange portion 62 is provided with a sidewall 63 erecting along the side surface of the terminal head 71A and partially covering the terminal head 71A.

A lower surface 62a of the flange portion 62 is provided with an abutting surface 62b abutting on the lid 8. The abutting surface 62b is formed by partially thickening the flange portion 62. As illustrated in FIG. 6(b), the abutting surface 62b is provided coaxially with the cylindrical portion 61, and the external shape of the abutting surface 62b is circular so that the abutting surface 62b may be continuous annularly along the outer circumference of the cylindrical portion 61. The external shape of the abutting surface 62b is smaller than the external shape of the lower surface of the positive electrode terminal 7A.

The insulating plate 5 functions to prevent electric contact between the positive electrode collector plate base portion 41A and the lid 8 and is formed in a larger plate shape than that of the positive electrode collector plate base portion 41A. The insulating plate 5 is made of a harder and more rigid material than a material for the gasket 6 such as polyphenylene sulfide (PPS), a rigid plastic defined in JISK6900, and an insulating resin into which glass fiber is mixed with the rigid plastic.

The insulating plate 5 is provided with the stepped hole 51 in which the shaft portion 73A of the positive electrode terminal 7A is inserted. As illustrated in FIG. 6(a), the stepped hole 51 includes a small-diameter portion in which the shaft portion 73A is inserted and a large-diameter portion further increased in diameter than the small-diameter portion with a step surface interposed therebetween and housing the tip end of the cylindrical portion 61 of the gasket 6.

As illustrated in FIG. 5(a), in the positive electrode terminal 7A, the shaft portion 73A of the positive electrode terminal 7A is inserted into the cylindrical portion 61 of the gasket 6, and the shaft portion 73A of the positive electrode terminal 7A and the cylindrical portion 61 of the gasket 6 are inserted into the through hole 8A of the lid 8. Before the swaging portion 74A of the shaft portion 73A is swaged, the gasket 6 is not compressed, and the space between the positive electrode terminal 7A and the lid 8 is not sealed. As illustrated in FIG. 5(b), when the swaging portion 74A of the shaft portion 73A is swaged, the gasket 6 is interposed between the positive electrode terminal 7A and the lid 8 while the distance between the upper surface of the flange portion 62 and the abutting surface 62b is kept in a compressed state in the thickness direction to enable the space between the positive electrode terminal 7A and the lid 8 to be sealed.

The gasket 6 is interposed between the lid 8 and the positive electrode terminal 7A in the compressed state to function as a seal portion. Hereinbelow, an interposed part of the gasket 6 interposed in the compressed state will be referred to as an interposed portion 6a, and this seal structure will be referred to as swaging seal. The swaging seal exerts seal performance due to the surface pressure generated between the abutting surface 62b of the positive electrode terminal 7A and the lid 8 by compressive load of the interposed portion 6a.

As illustrated in FIG. 6(b), the abutting surface 62b is provided at a part of the lower surface 62a, and the external shape of the interposed portion 6a is smaller than the external shape of the lower surface 62a of the gasket 6 and the external shape of the lower surface 72A of the positive electrode terminal 7. The interposed portion 6a of the gasket 6 is thicker than the other part of the gasket 6 interposed between the lid 8 and the positive electrode terminal 7A.

Accordingly, the area of the interposed portion 6a is smaller in a case of contacting the abutting surface 62b to the lid 8 than in a case of contacting the entire lower surface 62a of the flat gasket 6 provided with no abutting surface 62b to the lid 8. Thus, at the time of swaging with the same swaging force, the compression force of the interposed portion 6a per unit area can be higher, and the higher seal performance can be achieved, in the case of contacting the abutting surface 62b to the lid 8. Hence, it is possible to improve the seal performance of the gasket with the simple structure without enlarging the shaft of the terminal.

Also, in the present embodiment, the cross-section of the shaft portion 73A of the positive electrode terminal 7A is circular, and the external shape of the abutting surface 62b of the gasket 6 is also circular, as illustrated in FIG. 6(b). While the cross-section of the shaft portion 73A is circular, the external shape of the abutting surface 62b is also circular and has a similarity relationship with the cross-section of the shaft portion 73A. The abutting surface 62b is formed in an annular shape with a length w in the radial direction equal in the circumferential direction. Thus, the external shape of the interposed portion 6a has a similarity relationship with the external shape of the shaft portion 73A, and the external shape of the interposed portion 6a is arranged to be equally distant in the radial direction from the external shape of the shaft portion 73A. Accordingly, in a case in which the interposed portion 6a is interposed and compressed between the lid 8 and the lower surface 72A of the positive electrode terminal 7A, expansion of the interposed portion 6a in the radial direction is equal in the circumferential direction, and a smooth seal surface can be formed.

In a case in which the expansion of the interposed portion 6a differs significantly in the radial direction, the seal surface of the gasket 6 is deformed when the gasket 6 is in an interposed and compressed state. Since the rectangular secondary cell 100 is kept in a heat cycle environment in which a temperature increase due to heating during use and a temperature decrease due to stop of use are repeated, the gasket 6 repeats expansion and contraction in accordance with temperature changes. Thus, the expansion and the contraction of the gasket 6 are repeated in a state in which the seal surface is deformed due to the heat cycle, the deformation of the seal surface may be increased, and sufficient seal performance may not be obtained.

Conversely, in the present embodiment, the length w of the abutting surface 62b in the radial direction is equal in the circumferential direction, the expansion of the interposed portion 6a in the radial direction is equal in the circumferential direction, and the seal surface is less deformed. Accordingly, even when the expansion and the contraction of the gasket 6 are repeated due to the heat cycle, sufficient seal performance can be obtained, and the seal performance can be highly reliable.

FIG. 7 illustrates another example of the seal structure according to the present embodiment.

Figure 7A:
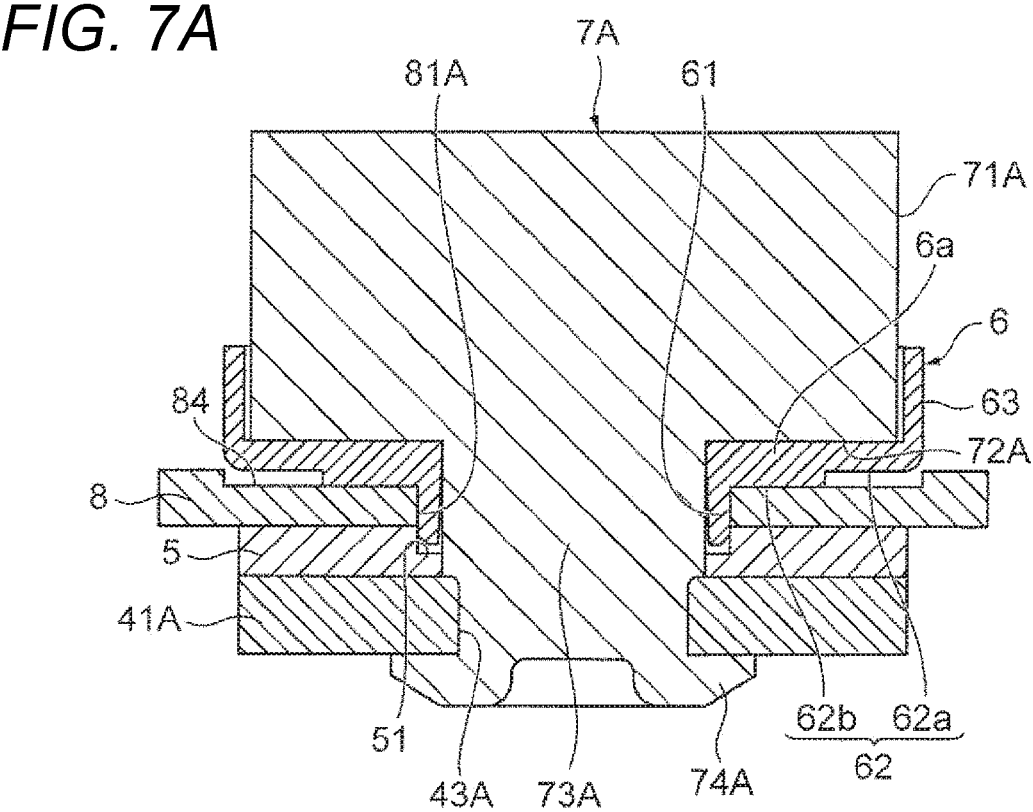
FIGS. 7A and 7B illustrate another example of the seal structure according to the first embodiment.
Figure 7B:
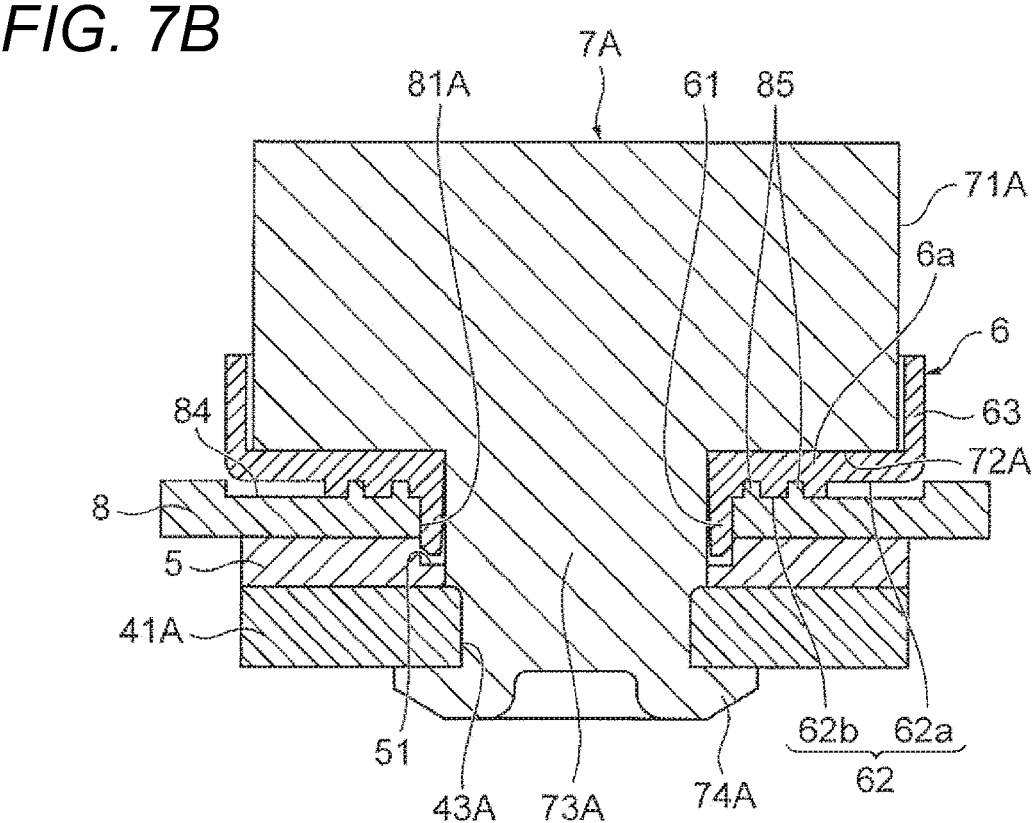

The characteristic of an example illustrated in FIG. 7 (a) is providing the upper surface of the lid 8 with a recess 84 abutting on the abutting surface 62b of the gasket 6, and the characteristic of an example illustrated in FIG. 7(b) is providing the surface of the lid 8 opposed to the interposed portion 6a with annular protrusions 85 to form seal points between the lid 8 and the gasket 6.

As illustrated in FIG. 7(a), the recess 84 is provided on the upper surface of the lid 8 around the through hole 8A of the lid 8 and is formed by thinning the lid 8 by means of press work, machine work, or the like. As described above, in the present embodiment, by providing the lower surface 62a of the gasket 6 with the abutting surface 62b having a smaller external shape than that of the lower surface 72A of the positive electrode terminal 7A, the compression force of the interposed portion 6a of the gasket 6 per unit area can be increased. Thus, in a case in which at least the same compression force as a conventional one is required to be secured, the positive electrode terminal 7A can be swaged with a lower swaging force than a conventional one, and the lid 8 can be prevented from being deformed even when the recess 84 is provided to cause the lid 8 to be thinned. By thinning the lid 8, the height of the positive electrode terminal 7A from the lid 8 can be shorter. Consequently, the total height of the rectangular secondary cell 100 can be shortened, and a requirement of users for a shorter cell can be satisfied.

In the example illustrated in FIG. 7(b), the two protrusions 85 are formed at the same time as the recess 84 is formed by means of the press work, the machine work, or the like and are provided concentrically along the circumference of the through hole 8A. The protrusions 85 are provided at positions opposed to the abutting surface 62b of the gasket 6. When the interposed portion 6a is interposed and compressed between the recess 84 of the lid 8 and the lower surface 72A of the positive electrode terminal 7A, the protrusions 85 partially compress the interposed portion 6a to form the seal points. Accordingly, the adhesiveness of the seal surface can further be improved, and higher seal performance can be obtained. It is to be noted that the number of the protrusions 85 is not limited to two and may be one or three or more. Also, the protrusions 85 may be provided without providing the recess 84 in the lid 8.

Although the seal structure of the positive electrode terminal 7A has been described mainly, and description of the seal structure of the negative electrode terminal 7B is omitted, in the aforementioned embodiment, the scope of the present invention is not limited to the positive electrode side, and the negative electrode has a similar configuration.

Second Embodiment

Figure 8A:
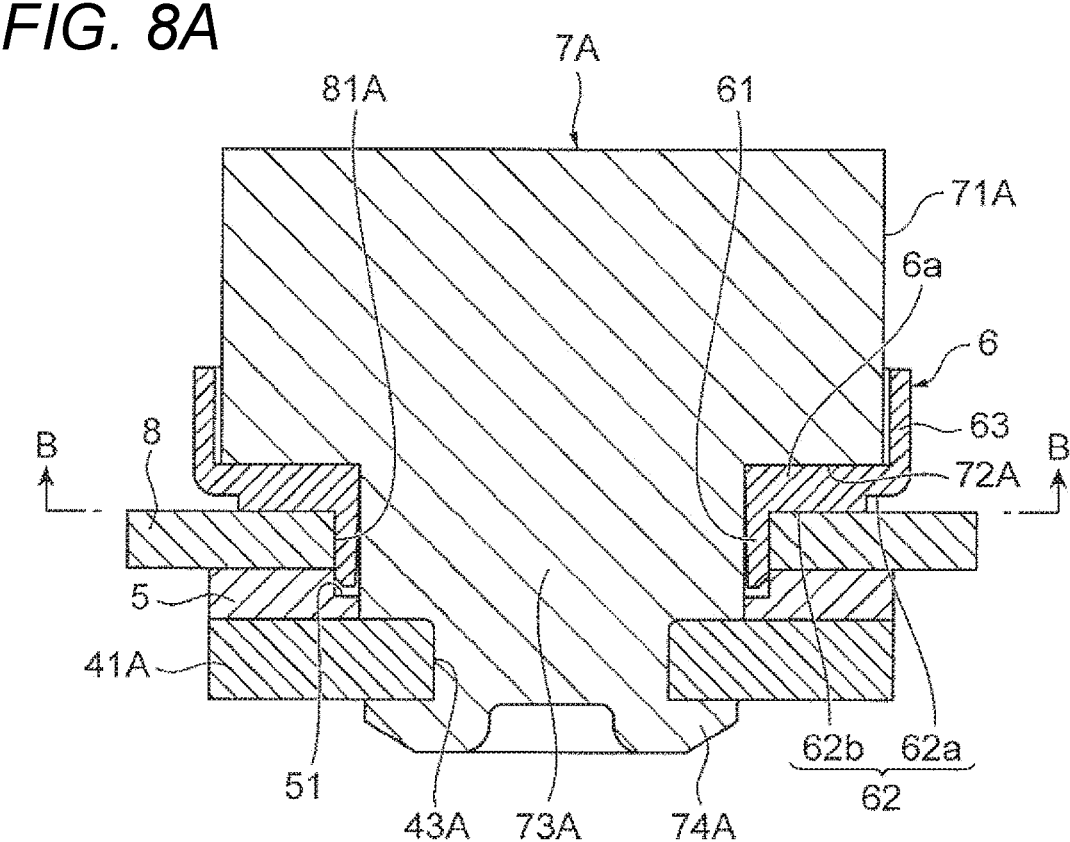
FIGS. 8A and 8B illustrate an example of the seal structure according to a second embodiment.
Figure 8B:
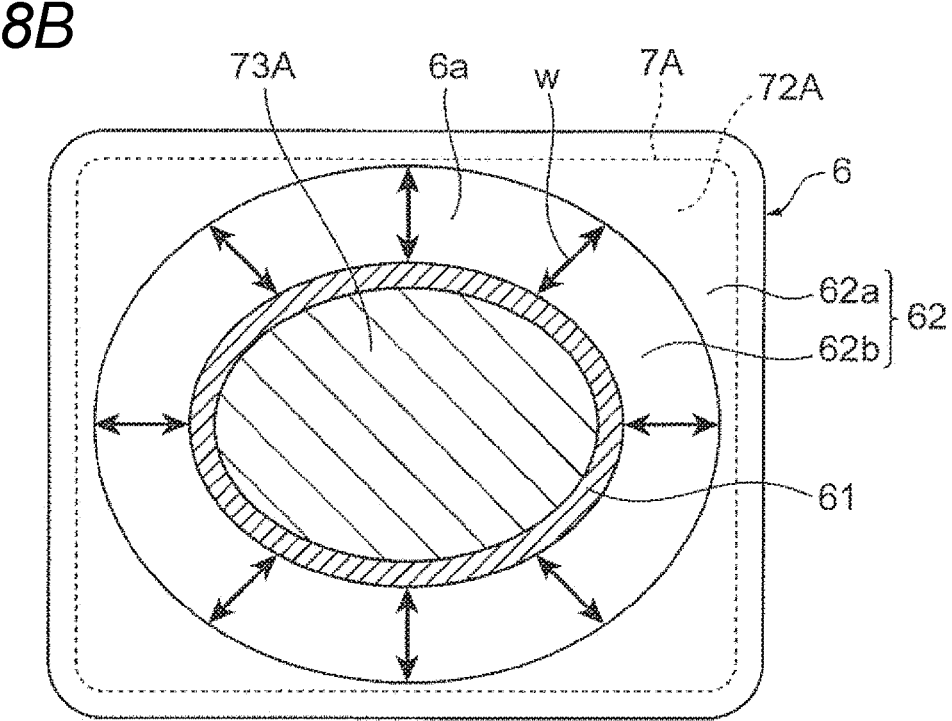

FIG. 8 illustrates an example of the seal structure according to a second embodiment. FIG. 8(a) is an enlarged view of a main part of the seal structure, and FIG. 8(b) is a cross-sectional view along the line B-B in FIG. 8(a).

The characteristic of the present embodiment is that the shaft portion 73A of the positive electrode terminal 7A is in an elliptic cylindrical shape and has an elliptic cross-section, that, corresponding to the shape, the external shape of the abutting surface 62b is also elliptic and has a similarity relationship with the shaft portion 73A, and that the abutting surface 62b is in an elliptic annular shape so that the length w of the abutting surface 62b in the radial direction may be equal in the circumferential direction.

In the present embodiment, the shaft portion 73A of the positive electrode terminal 7A has the elliptic cross-section, and the abutting surface 62b of the gasket 6 is in the elliptic annular shape so that the length w of the abutting surface 62b in the radial direction may be equal in the circumferential direction. Accordingly, in a case in which the interposed portion 6a is interposed and compressed between the lid 8 and the lower surface 72A of the positive electrode terminal 7A, expansion of the interposed portion 6a in the radial direction is equal in the circumferential direction, and a smooth seal surface can be formed. Thus, the seal surface is less deformed. Even when the expansion and the contraction of the gasket 6 are repeated due to the heat cycle, sufficient seal performance can be obtained, and the seal performance can be highly reliable.

In the present embodiment as well, since the external shape of the interposed portion 6a is smaller than the external shape of the lower surface 62a of the gasket 6 and the external shape of the lower surface 72A of the positive electrode terminal 7, the compression force of the interposed portion 6a per unit area can be increased, and higher seal performance can be obtained. Also, although the seal structure of the positive electrode terminal 7A has been described mainly, and description of the seal structure of the negative electrode terminal 7B is omitted, in the aforementioned embodiment, the scope of the present invention is not limited to the positive electrode side, and the negative electrode has a similar configuration.

Third Embodiment

Figure 9A:
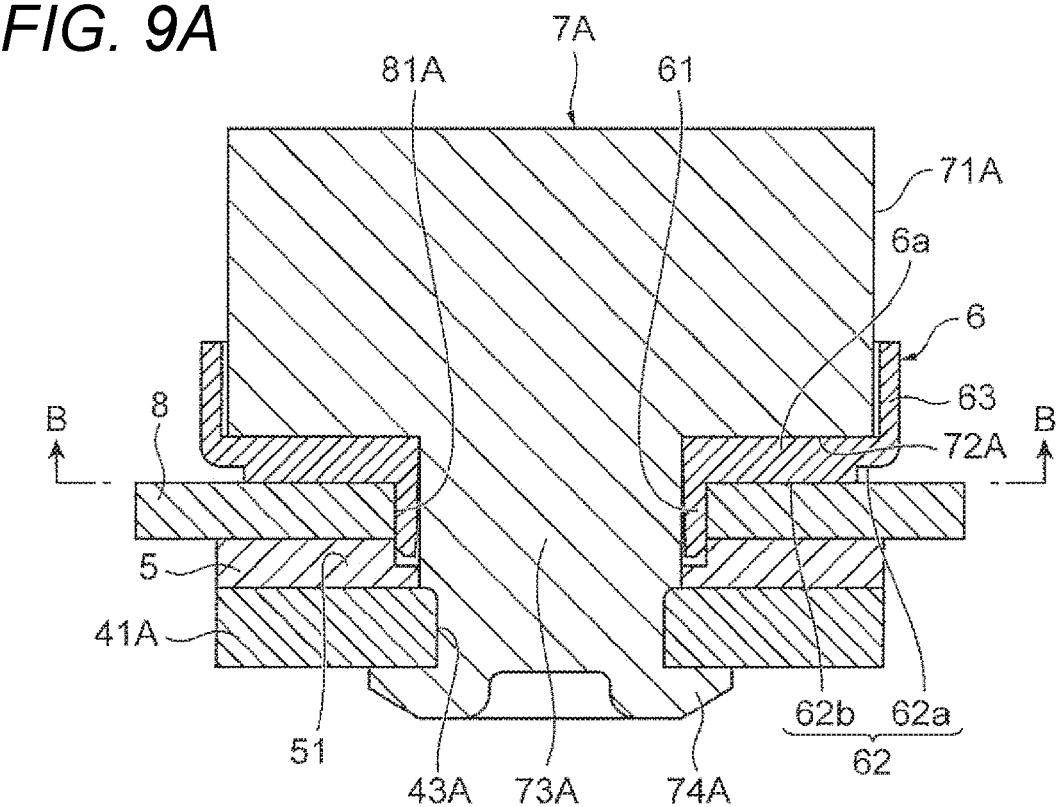
FIGS. 9A and 9B illustrate an example of the seal structure according to a third embodiment.
Figure 9B:
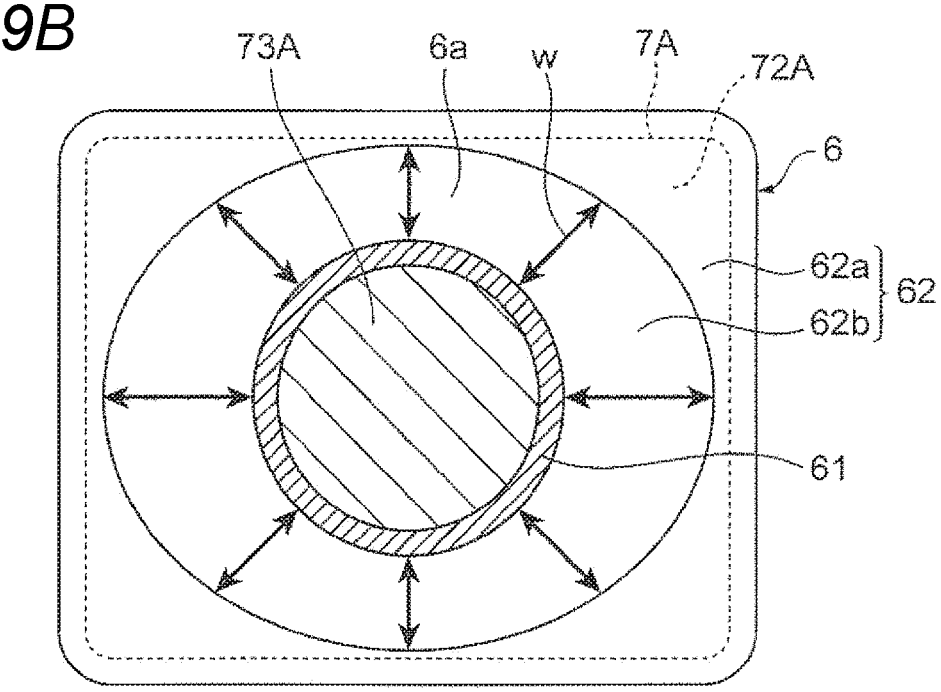

FIG. 9 illustrates an example of the seal structure according to a third embodiment. FIG. 9(a) is an enlarged view of a main part of the seal structure, and FIG. 9(b) is a cross-sectional view along the line B-B in FIG. 9(a).

The characteristic of the present embodiment is that the shaft portion 73A of the positive electrode terminal 7A is in a cylindrical shape and has a circular cross-section while the external shape of the abutting surface 62b is elliptic. The length w of the abutting surface 62b in the radial direction differs in the longer direction and in the shorter direction of the flange portion 62 of the gasket 6, and the length w in the longer direction of the flange portion 62 is longer than the length w in the shorter direction of the flange portion 62.

Unlike the first and second embodiments, in the present embodiment, a length W of the abutting surface 62b of the gasket 6 in the radial direction is not entirely equal in the circumferential direction. However, the difference is small. In a case in which the interposed portion 6a is interposed and compressed between the lid 8 and the lower surface 72A of the positive electrode terminal 7A, the difference of the expansion of the interposed portion 6a in the radial direction can be small. Accordingly, similarly to the first and second embodiments, a smooth seal surface can be formed, and the seal surface is less deformed. Even when the expansion and the contraction of the gasket 6 are repeated due to the heat cycle, sufficient seal performance can be obtained, and the seal performance can be highly reliable.

In the present embodiment as well, since the external shape of the interposed portion 6a is smaller than the external shape of the lower surface 62a of the gasket 6 and the external shape of the lower surface 72A of the positive electrode terminal 7, the compression force of the interposed portion 6a per unit area can be increased, and higher seal performance can be obtained.

Also, although the seal structure of the positive electrode terminal 7A has been described mainly, and description of the seal structure of the negative electrode terminal 7B is omitted, in the aforementioned embodiment, the scope of the present invention is not limited to the positive electrode side, and the negative electrode has a similar configuration.

Fourth Embodiment

Figure 10A:
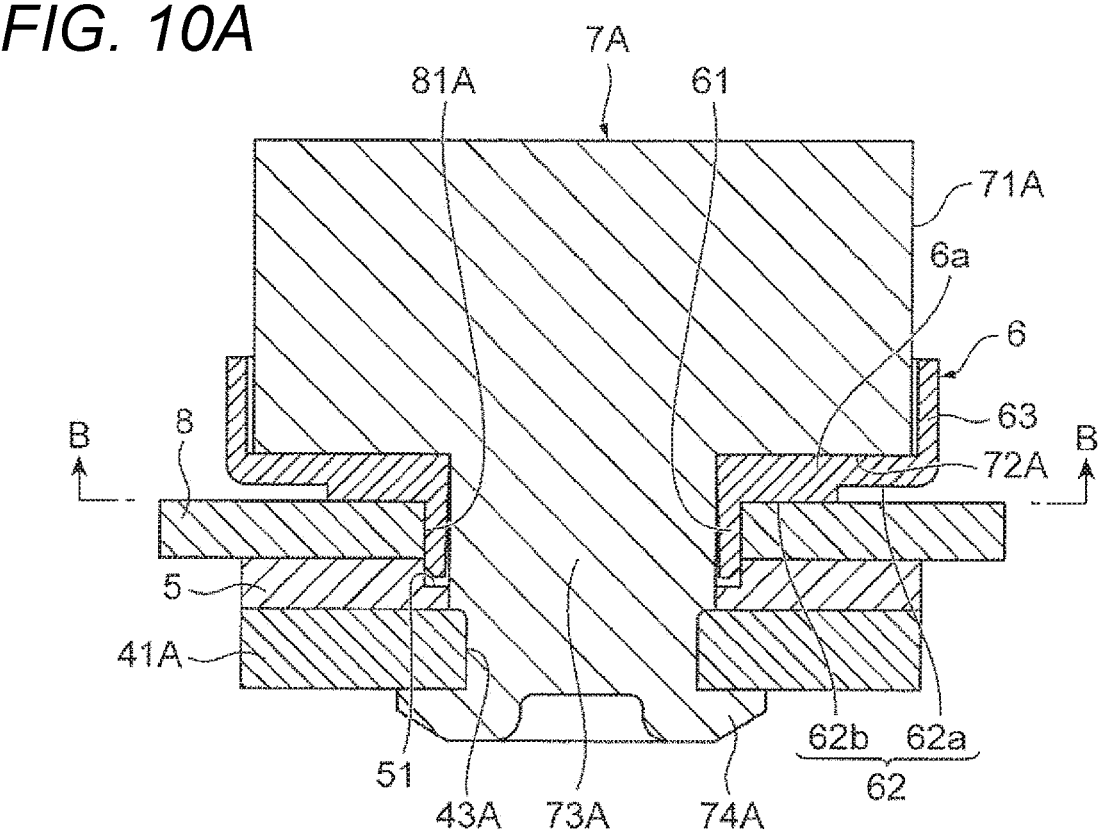
FIGS. 10A and 10B illustrate an example of the seal structure according to a fourth embodiment.
Figure 10B:
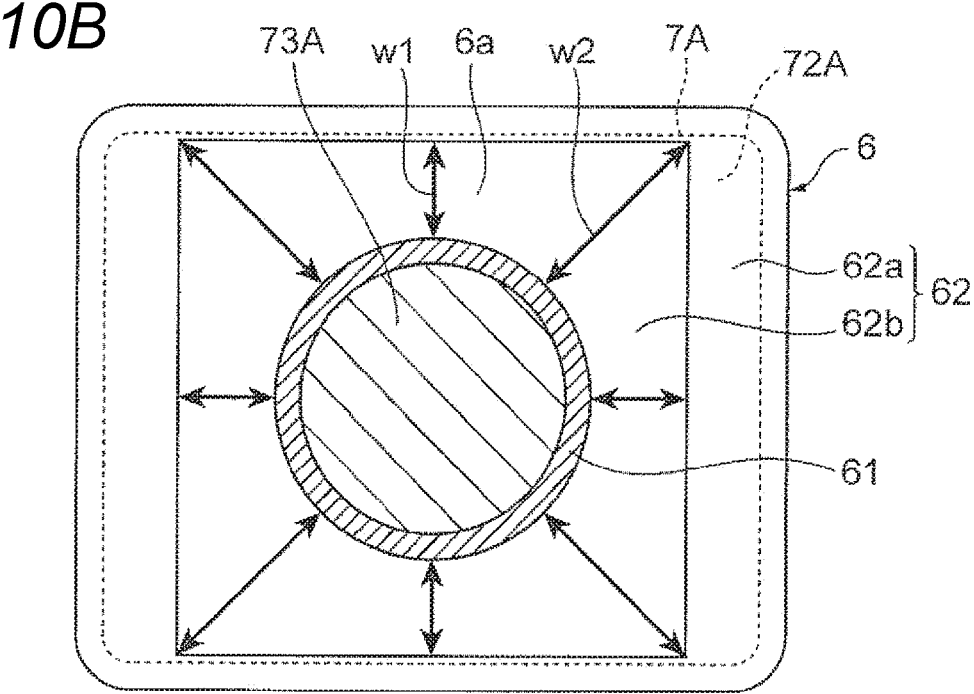

FIG. 10 illustrates an example of the seal structure according to a fourth embodiment. FIG. 10(a) is an enlarged view of a main part of the seal structure, and FIG. 10(b) is a cross-sectional view along the line B-B in FIG. 10(a).

The characteristic of the present embodiment is that the shaft portion 73A of the positive electrode terminal 7A is in a cylindrical shape and has a circular cross-section while the external shape of the abutting surface 62b is rectangular. A length w1 of the abutting surface 62b, which is a length in a direction perpendicular to the external shape of the flange portion 62 and which is the shortest, is shorter than a length w2 of the abutting surface 62b in the diagonal direction of the flange portion 62.

Similarly to the third embodiment, in the present embodiment, the length W of the abutting surface 62b of the gasket 6 in the radial direction is not entirely equal in the circumferential direction. However, the difference is less than double (w2<w1×2). In a case in which the interposed portion 6a is interposed and compressed between the lid 8 and the lower surface 72A of the positive electrode terminal 7A, the difference of the expansion of the interposed portion 6a in the radial direction can be small. Accordingly, similarly to the first and second embodiments, a smooth seal surface can be formed, and the seal surface is less deformed. Even when the expansion and the contraction of the gasket 6 are repeated due to the heat cycle, sufficient seal performance can be obtained, and the seal performance can be highly reliable.

In the present embodiment as well, since the external shape of the interposed portion 6a is smaller than the external shape of the lower surface 62a of the gasket 6 and the external shape of the lower surface 72A of the positive electrode terminal 7, the compression force of the interposed portion 6a per unit area can be increased, and higher seal performance can be obtained.

Also, although the seal structure of the positive electrode terminal 7A has been described mainly, and description of the seal structure of the negative electrode terminal 7B is omitted, in the aforementioned embodiment, the scope of the present invention is not limited to the positive electrode side, and the negative electrode has a similar configuration.

Example

A heat cycle test ranging from a high temperature to a low temperature for the rectangular secondary cells 100 according to the first to fourth embodiments was conducted. As a comparative example, a rectangular secondary cell in which the external shape of the abutting surface 62b of the flange portion 62 is rectangular as in the fourth embodiment and is approximately equal in size to the lower surface 72A of the positive electrode terminal 7A, and in which the length w2 in the diagonal direction of the flange portion 62 is twice or more times the length w1, which is the length in the direction perpendicular to the external shape of the flange portion 62 and which is the shortest, was used. In test conditions, one cycle corresponds to one year, and the temperature range in consideration of the use environment is from 90° C. to −40° C.

Each of the rectangular secondary cells 100 according to the first to fourth embodiments had an extremely low mass decrease value after ten cycles corresponding to ten years and satisfied high seal performance. Conversely, in the comparative example, since the seal surface is deformed, the deformation was increased through repetition of the expansion and the contraction due to the heat cycle from the high temperature to the low temperature. The rectangular secondary cell in the comparative example did not exert sufficient seal performance and did not achieve a required mass decrease value after the ten cycles.

According to the present invention, in the interposed portion 6a interposed and compressed between the lid 8 and the lower surface 72A of the positive electrode terminal 7A, the difference in length from the cylindrical portion 61 to the external shape of the interposed portion 6a in the radial direction is decreased, and the difference in displacement and expansion of the interposed portion 6a of the gasket 6 is restricted, to achieve the smooth seal surface. Accordingly, it is possible to provide the rectangular secondary cell 100 enabling the seal performance in the heat cycle environment from the high temperature to the low temperature to be improved. According to the present invention, since the rectangular secondary cell 100 serving as a cell can be decreased in size, an increase of part cost can be suppressed, and the interposed portion 6a of the gasket 6 has a uniform surface pressure distribution and is formed in a shape providing efficient surface pressure, a rectangular secondary cell having high seal performance can be provided.

Although the embodiments of the present invention have been described above, the present invention is not limited to the foregoing embodiments and can be changed in design in various ways without departing from the spirit of the present invention described in the claims. For example, the foregoing embodiments have been described in detail to facilitate understanding of the present invention, and the present invention is not limited to one including all of the components described herein. Also, some components of one embodiment can be substituted with components of another embodiment, and components of another embodiment can be added to components of one embodiment. Further, some components of each embodiment can be added, deleted, and substituted with other components.

REFERENCE SIGNS LIST 1 cell can
3 winding group
6 gasket
6a interposed portion
61 cylindrical portion
62 flange portion
62a lower surface
62b abutting surface
7A positive electrode terminal (external terminal)
71A terminal head
72A lower surface 73A shaft portion
7B negative electrode terminal (external terminal)
8 lid
84 recess
85 protrusion
11 opening portion
100 rectangular secondary cell

The invention claimed is:

1. A rectangular secondary cell comprising:
a cell can housing a winding group and having an opening portion;
an external terminal that is configured as a unitary body;
a lid provided with the external terminal, which is electrically connected to the winding group, and closing the opening portion; and
a gasket having a cylindrical portion through which a shaft portion of the external terminal is adapted to pass and a flange portion radially extending outward from a base end of the cylindrical portion, the flange portion including an interposed portion interposed between the lid and a lower surface of the external terminal, wherein, in the gasket, the interposed portion, which extends radially outward from the cylindrical portion, is thicker than other parts of the gasket interposed between the lid and the lower surface of the external terminal,
wherein the shaft portion is provided at a tip end portion of the external terminal with a swaging portion,
wherein, in the gasket, an external shape of the interposed portion is smaller than an external shape of the lower surface of the external terminal, wherein the external terminal includes a terminal head formed in a rectangular shape and the shaft portion protruded in the cell can and formed in a cylindrical or elliptic cylindrical shape, and wherein, in the gasket, the external shape of the interposed portion has a similarity relationship with an external shape of the shaft portion,
wherein a lower surface of the interposed portion is provided with an abutting surface abutting on the lid, the abutting surface extending continuously from the cylindrical portion to a middle of the flange portion, and a gap is disposed between the lid and the gasket from the middle of the flange portion to a radially outermost end of the gasket,
wherein the abutting surface is coaxially arranged with the cylindrical portion and abutting on the lid, an external shape of the abutting surface is smaller than the external shape of the lower surface, and the external shape of the abutting surface corresponds to a cross-section of the shaft portion, and
wherein, in the gasket, a space between an upper surface of the flange portion and the abutting surface is in a compressed state in a thickness direction due to the swaging portion.

2. The rectangular secondary cell according to claim 1, wherein, in the gasket, the external shape of the interposed portion is arranged to be equally distant in a radial direction from the external shape of the shaft portion.

3. The rectangular secondary cell according to claim 1, wherein, in the gasket, the interposed portion is arranged on a recess provided in the lid.

4. The rectangular secondary cell according to claim 1, wherein a surface of the lid opposed to the interposed portion is provided with a protrusion formed in an annular shape.

5. The rectangular secondary cell according to claim 4, wherein the protrusion includes a plurality of protrusions.

6. The rectangular secondary cell according to claim 1, further comprising:
an insulating plate disposed in contact with a bottom surface of the lid such that the lid is interposed between the abutting surface of the interposed portion and an upper surface of the insulating plate; and
an electrode collector plate base portion interposed between the insulating plate and the swaging portion of the external terminal;
wherein the swaging portion of the external terminal includes a recess that is disposed entirely outside of the electrode collector plate base portion.

* * * * *